(12) United States Patent
Luo et al.

(10) Patent No.: US 12,433,287 B1
(45) Date of Patent: Oct. 7, 2025

(54) MOUSE CATCHING DEVICE

(71) Applicant: Shenzhen Visson Technology Co., Ltd., Guangdong (CN)

(72) Inventors: Chengyang Luo, Guangdong (CN); Guoqing Hu, Guangdong (CN)

(73) Assignee: Shenzhen Visson Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/973,102

(22) Filed: Dec. 8, 2024

(30) Foreign Application Priority Data

Oct. 29, 2024 (CN) .......................... 202422612830.1

(51) Int. Cl.
*A01M 23/24* (2006.01)
*A01M 23/38* (2006.01)

(52) U.S. Cl.
CPC ............ *A01M 23/24* (2013.01); *A01M 23/38* (2013.01)

(58) Field of Classification Search
CPC ...... A01M 23/24; A01M 23/30; A01M 23/38; A01M 23/16; A01M 23/245
USPC ............................ 43/75, 77, 81, 82, 83, 83.5
See application file for complete search history.

(56) References Cited

U.S. PATENT DOCUMENTS

| | | | | |
|---|---|---|---|---|
| 5,109,626 | A | * | 5/1992 | Ha .................. A01M 23/22 43/79 |
| 2018/0271085 | A1 | * | 9/2018 | Sørensen ............. A01M 23/38 |
| 2018/0317475 | A1 | * | 11/2018 | Redmayne .......... A01M 31/002 |
| 2020/0187485 | A1 | * | 6/2020 | Damgaard Jensen ...................... A01M 23/30 |
| 2021/0076663 | A1 | * | 3/2021 | Chisholm ............. A01M 23/30 |
| 2021/0244012 | A1 | * | 8/2021 | Frazier ................. A01M 23/24 |
| 2022/0039370 | A1 | * | 2/2022 | Holm .................... A01M 23/14 |

FOREIGN PATENT DOCUMENTS

CN           111149791 A    *   5/2020 ............ A01M 23/38

OTHER PUBLICATIONS

CN 111149791 A english translation (Year: 2020).*

* cited by examiner

*Primary Examiner* — Peter M Poon
*Assistant Examiner* — Danielle A Clerkley

(57) ABSTRACT

A mouse catching device includes a main massage body and a flexible massage body. The main massage body has opposite first and second sides, the main massage body defines a through hole therein, and the through hole running through the main massage body from the first side to an second side. The flexible massage body is connected to the main massage body, and the flexible massage body is bendable and insertable through the through hole. A first vibration source is arranged in the main massage body, a second vibration source is arranged in the flexible massage body.

15 Claims, 10 Drawing Sheets

MOUSE CATCHING DEVICE

CROSS-REFERENCE TO RELATED APPLICATIONS

The present application claims priority of Chinese Patent Application No. 202422612830.1, filed on Oct. 29, 2024, the entire contents of which are hereby incorporated by reference.

TECHNICAL FIELD

The present application relates to the technical field of mouse catching mechanism, and in particular to a mouse catching device.

BACKGROUND

As a rodent of Mammalia, Rodentia and Muridae, mice spread pathogens such as plague, epidemic hemorrhagic fever, leptospirosis, typhus fever and tick relapsing fever due to they frequent appear in sewerage, kitchen, litter pile and garbage bin. Mice also bite books, clothing, furniture and other things, affecting human's living environment.

In traditional deratization, mouse traps are usually used to catch mice. However, when the mouse is caught by the mouse trap, the mouse is still not dead, and the mouse has to be killed by human. Subsequently, the mouse should be by removed from the mouse trap and the trap should be reset in time by human, that results in a complicated process in deratization.

SUMMARY

An object of this disclosure is to provide a mouse catching device, which is capable of solving or at least mitigating the above-described technical problems.

To achieve the above object, a mouse catching device is provided and includes:
  a housing defining an internal channel, and a latching lock being movably connected to the housing;
  a hitting member slidably connected to the housing along a predetermined direction, the hitting member having a first position and a second position relative to the housing; the hitting member extending into the internal channel with a greater extent at the first position than at the second position, and the latching lock configured to lock the hitting member in the second position;
  at least one first elastic member connected to the hitting member, the at least one first elastic member configured to exert an elastic force on the hitting member, which enabling the hitting member to slide from the second position to the first position; and
  a reset push block slidably connected to the housing, the reset push block connected to a reset driving member, the reset push block configured to push the hitting member to the second position driven by the reset driving member, and the reset push block also configured to move away from the hitting member along a direction towards the internal channel driven by the reset driving member.

With the above-described mouse catching device, before capturing mice, the hitting member is locked in the second position by the latching lock, so that the hitting member does not block the mouse passing through the internal channel. When the mouse climbs into the internal channel, the latching lock is triggered by the mouse to unlock the hitting member. After unlocking, due to the elasticity of the first elastic member, the hitting member is catapulted into the internal channel in a direction from the second position to the first position, and produces a violent impact on the mouse in the internal channel, thus capturing the mouse. When the mouse is killed, the reset driving member drives the reset push block to slide along a direction from the first position to the second position. The hitting member is pushed to the second position by the reset push block, thus the hitting member is automatically separated from the body of the mouse. When the hitting member reaches the second position, the hitting member is re-locked by the latching lock, and subsequently, the reset push block driven by the reset driving member moves away from the hitting member along a direction towards the internal channel. When the body of the mouse slips or is removed from the internal channel, the mouse catching device is ready for the next capturing and killing action, which helps to simplify the deratization process. Before the hitting member is catapulted into internal channel for one more time, due to the reset push block is separated from the hitting member, the hitting member will not be blocked by the reset push block or the reset driving member during being catapulted into the internal channel, which results in that the hitting member has a large catapulting speed and produces an violent impact on the mouse in the internal channel, thus improving success rate of catching mice.

In one of the embodiments, the housing is connected with a support and a limit bracket, the support is arranged opposite to the limit bracket, the hitting member is slidably arranged between the support and the limit bracket; a guiding groove is defined in at least one of the support and the limit bracket, an extension direction of the guiding groove corresponds to the predetermined direction; the hitting member is connected to a slider, and the slider is slidably received in the guiding groove.

In one of the embodiments, the hitting member includes a hitting head and a support body, the support body is connected to an end of the hitting head away from the internal channel; the support body is movably disposed between the support and the limit bracket, and the slider is connected to the support.

In one of the embodiments, the at least one first elastic member includes two torsional elastic elements, the two torsional elastic elements are arranged on opposite sides of the support body, and both ends of either of the two torsional elastic elements are connected to the support body and the housing respectively.

In one of the embodiments, further comprises a rack and a gear engaged with the rack, the rack is slidably disposed relative to the housing, the reset driving member is connected to the housing, the reset driving member has an output shaft connected to the gear, and the rack is connected to reset push block.

In one of the embodiments, further comprises a first trip limit and a second trip limit, an end of the rack away from the internal channel forms a trigger engagement with the second trip limit, an end of the rack adjacent to the internal channel forms a trigger engagement with the first trip limit, and the first trip limit and the second trip limit form signal feedback engagement with the reset driving member respectively.

In one of the embodiments, further includes a support, a guiding slot is defined in the support, the rack is slidably received in the guiding slot, and the reset driving member is connected to the support.

In one of the embodiments, further includes an unlocking module and an inductive trigger member, one end of the latching lock latches and engages with the hitting member, the unlocking module is configured to push the other end of the latching lock, and the inductive trigger member is configured to trigger the unlocking module to move when the mouse enters the internal channel.

In one of the embodiments, the unlocking module includes an unlocking driving member and a trigger block, the unlocking driving member is connected to the housing, and the unlocking driving member has an output shaft; the trigger block is connected to the output shaft of the unlocking driving member, and the trigger block is configured to push the other end of the latching lock.

In one of the embodiments, the unlocking module further includes a third trip limit, and the third trip limit and the unlocking driving member forms a signal feedback engagement.

In one of the embodiments, further includes a circuit module, the circuit module is electrically connected between the inductive trigger member and the unlocking module, and the circuit module controls the motion of the unlocking module according to a feedback signal of the inductive trigger member.

In one of the embodiments, the inductive trigger member has an inductive end, and the inductive end of the inductive trigger member is oriented towards the internal channel; the inductive trigger member includes a PIR inductive element, and/or the inductive trigger member includes an infrared inductive element.

In one of the embodiments, the inductive trigger member includes a PIR inductive element and an infrared inductive element, the mouse catching device includes a standby state and a dormant state; in the standby state, electric energy is supplied to the infrared inductive element and the PIR inductive element, thus the infrared inductive element and the PIR inductive element are ready for detect the mouse; in the dormant state, electric energy is stopped to supplied to the infrared inductive element, electric energy is supplied to the PIR inductive element, and the PIR inductive element is ready for detect the mouse.

In one of the embodiments, the first elastic member includes a torsional elastic element, the torsional elastic element includes a first torsional arm, a second torsional arm and a torsional body, the torsional body is connected between the first torsional arm and the second torsional arm, the first torsional arm is hooked to the support body, and the second torsion arm is hooked to the housing.

In one of the embodiments, the housing includes a first shell and a second shell, the first shell and the second shell cooperatively define a space for accommodating at least the hitting member, the first elastic member, the reset push block and the reset driving member; and the first shell and the second shell cooperatively define the internal channel.

In one of the embodiments, the hitting member includes a protrusion, a second elastic member is disposed between one end of the latching lock and the housing, the protrusion is configured to be engaged with the latching lock when the latching lock is in the second position.

BRIEF DESCRIPTION OF DRAWINGS

FIG. 8b is a cross sectional, three-dimensional view of the mouse catching device of FIG. 8a.

FIG. 9 is a schematic, three-dimensional view of the hitting member and the first elastic member of the mouse catching device of FIG. 8a.

FIG. 10 is a schematic, three-dimensional view of the reset driving member, the reset push block and the support of the mouse catching device of FIG. 8a.

Figure 1:
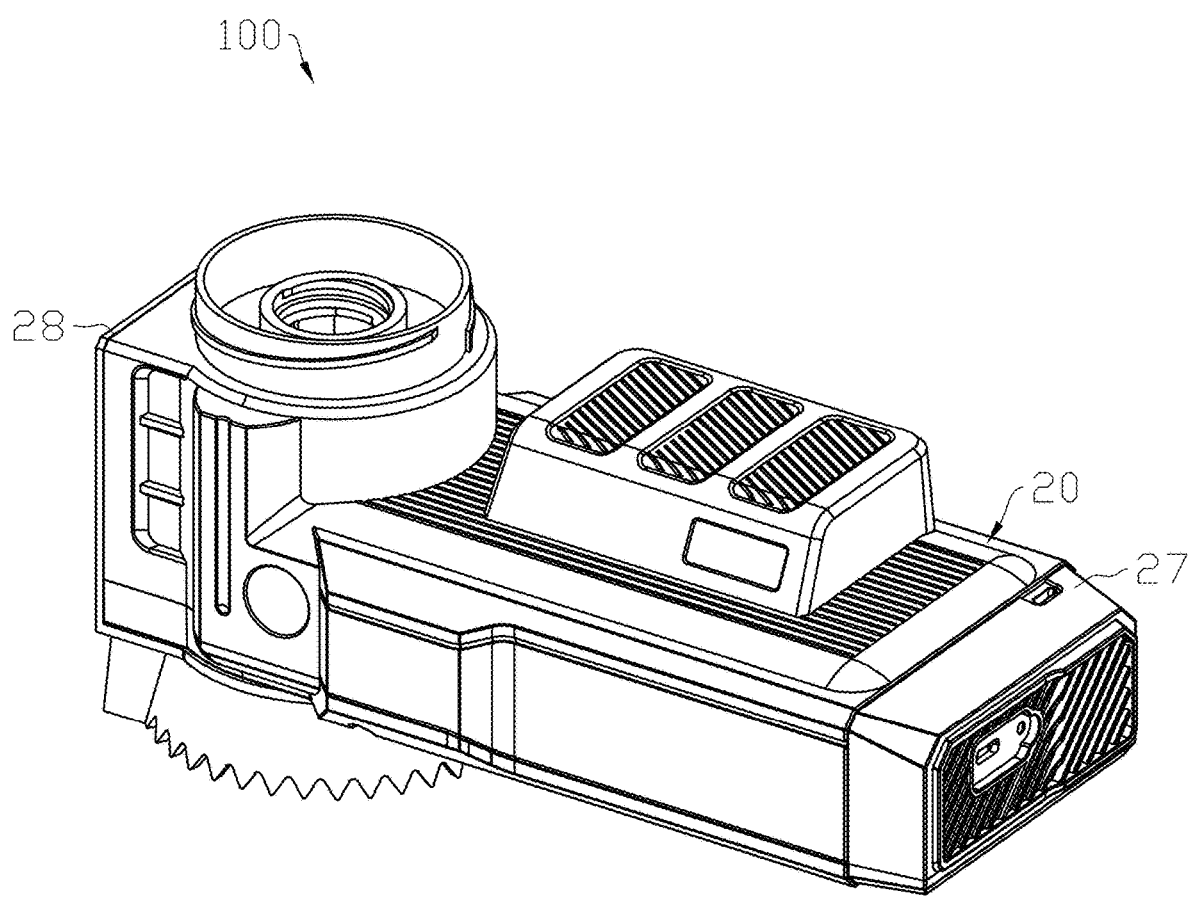
FIG. 1 is a schematic, three-dimensional view of a mouse catching device according to an embodiment of the present application.

Drawing reference: mouse catching device: 100; housing: 20; internal channel: 21; opening: 211; latching lock: 22; support: 23; guiding groove: 231; guiding slot: 232; limit bracket: 24; second elastic member: 25; first shell: 26; second shell: 27; mounting plate: 28; hitting member: 30; slider: 31; first resisting surface: 311; hitting head: 32; support body: 33; latching hole: 331; protrusion: 34; first elastic member: 40; first torsional arm: 41; second torsional arm: 42; torsional body: 43; reset driving member: 50; reset push block: 51; second resisting surface: 511; rack: 52; gear: 53; first trip limit: 54; second trip limit: 55; unlocking module: 60; unlocking driving member: 61; trigger block: 62; positioning plate: 63; third trip limit: 64; inductive trigger member: 70; PIR inductive element: 71; infrared inductive element: 72; circuit module: 80; electrical fixing plate: 81; power supply unit: 82; predetermined direction: F1.

DESCRIPTION OF EMBODIMENTS

The technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

In the description of the application, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application. Additionally, the terms "first", "second", "third" are only intended to facilitate the description, not to be understood to indicate or imply the importance thereof.

In the description of the application, it should be noted that unless otherwise specified and limited, the terms "assembled", "joined", "connected" should be explained in a broad scope, it may be fixedly connected to another element, detachably connected to another element, integrally connected to another element, mechanically connected to another element, electrically connected to anther element, directly connected to another element, indirectly connected to another element through one or multiple intermediate elements, or internal cavity of two elements communicated with each other. The specific meanings of all technical and scientific terms used in the specification can be specifically understood by persons of ordinary skill in the art.

A technical proposal of the embodiment of the application is described accompanying the drawings.

FIGS. 1-10 show at least one embodiment of a mouse catching device 100 of the present invention. Specifically, referring to FIG. 1 and FIG. 2, the mouse catching device 100 is configured to capture and kill mice to achieve the purpose of deratization.

Figure 2:
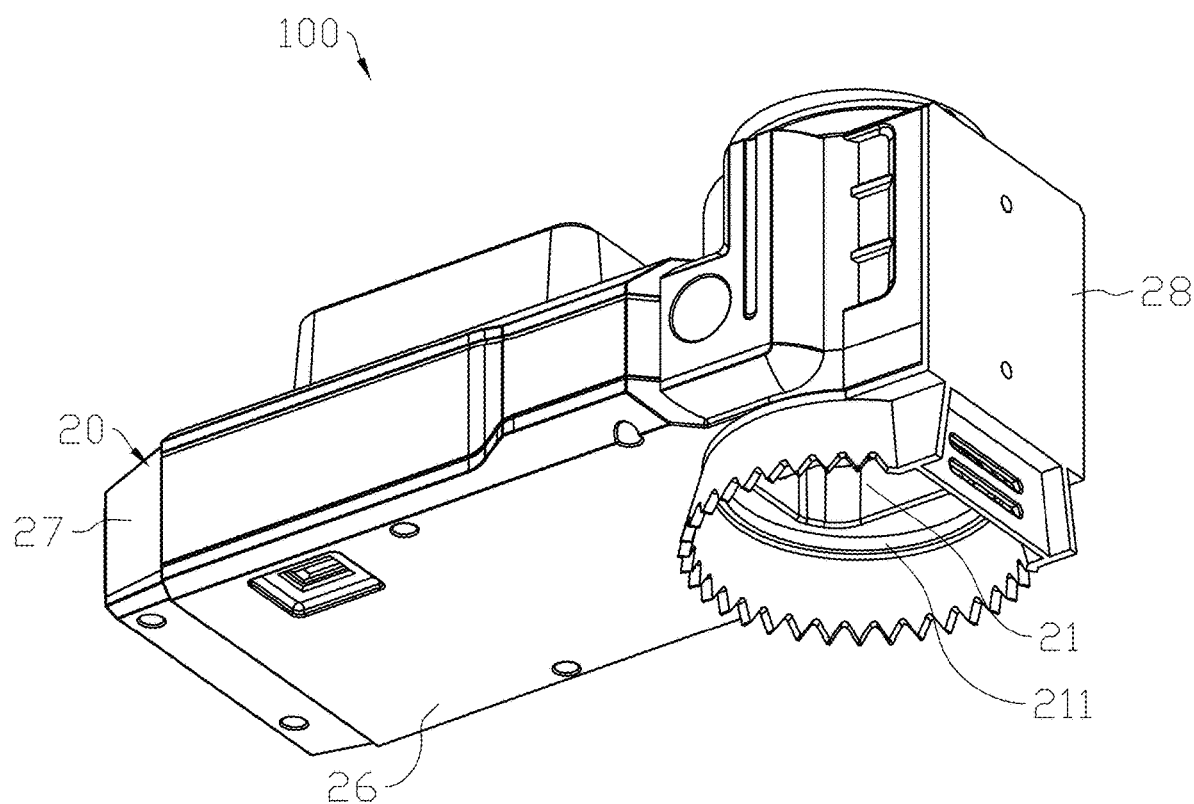
FIG. 2 is a schematic, three-dimensional view of the mouse catching device of FIG. 1 with another angle.
Figure 3:
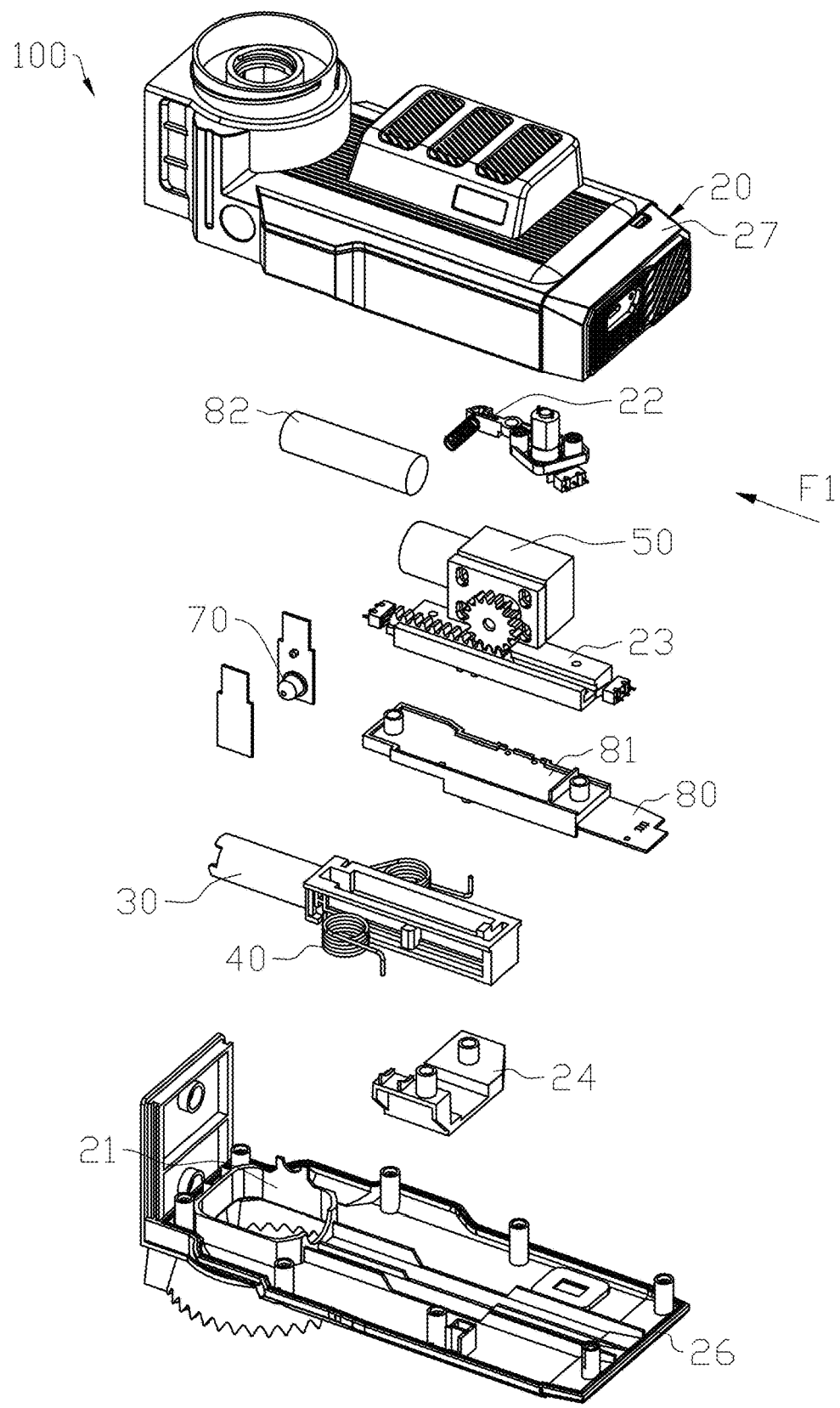
FIG. 3 is a schematic, exploded view of the mouse catching device of FIG. 1.
Figure 4:
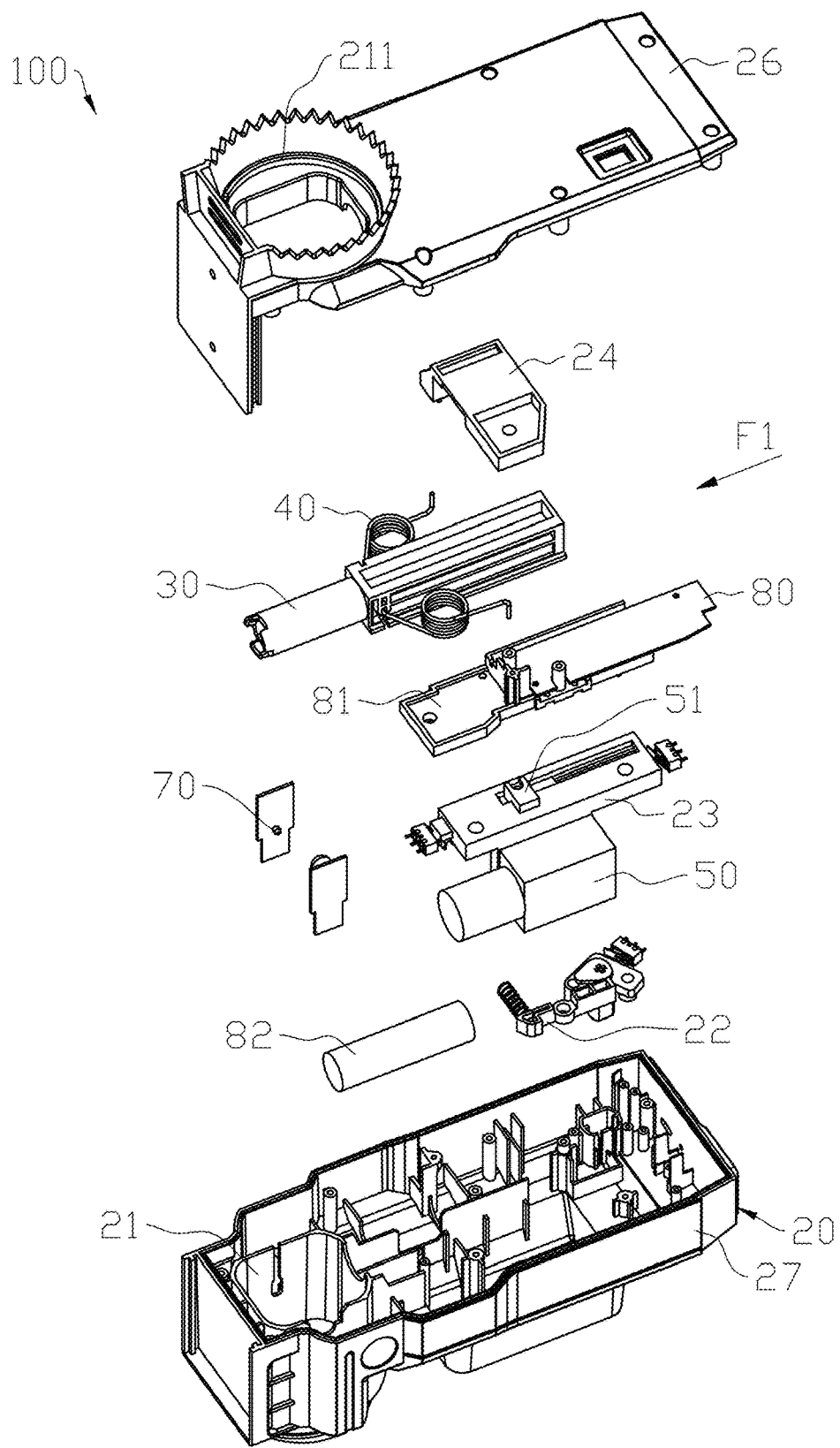
FIG. 4 is a schematic, exploded view of the mouse catching device of FIG. 1 with another angle.

Specifically, combined with shown in FIGS. 2-4, the mouse catching device 100 includes a housing 20, a latching lock 22, a hitting member 30, a reset push block 51, a reset driving member 50 and at least one first elastic member 40. An internal channel 21 is defined in the housing 20. The latching lock 22 is movably connected to the housing 20. The hitting member 30 is slidably connected to the housing 20 along a predetermined direction F1, and the hitting member 30 has a first position and a second position relative to the housing 20. The hitting member 30 extends into the internal channel 21 with a greater extent at the first position than at the second position. The latching lock 22 is configured to lock the hitting member 30 in the second position. At least one first elastic member 40 is connected to the hitting member 30, and the first elastic member 40 is configured to exert an elastic force on the hitting member 30, which enables the hitting member 30 to slide from the second position to the first position. The reset push block 51 is slidably connected to the housing 20, and the reset push block 51 is connected to the reset driving member 50. The reset push block 51 is configured to push the hitting member 30 to the second position driven by the reset driving member 50. The reset push block 51 is also configured to move away from the hitting member 30 along a direction towards the internal channel 21 driven by the reset driving member 50.

In the mouse catching device 100 of the application, before capturing mice, the hitting member 30 is locked in the second position by the latching lock 22, so that the hitting member 30 does not block the mouse passing through the internal channel 21. When the mouse climbs into the internal channel 21, the latching lock 22 is triggered by the mouse to unlock the hitting member 30. After unlocking, due to the elasticity of the first elastic member 40, the hitting member 30 is catapulted into the internal channel 21 in a direction from the second position to the first position, and produces a violent impact on the mouse in the internal channel 21, thus capturing the mouse. When the mouse is killed, the reset driving member 50 drives the reset push block 51 to slide along a direction from the first position to the second position. The hitting member 30 is pushed to the second position by the reset push block 51, thus the hitting member 30 is automatically separated from the body of the mouse. When the hitting member 30 reaches the second position, the hitting member 30 is re-locked by the latching lock 22, and subsequently, the reset push block 51 driven by the reset driving member 50 moves away from the hitting member 30 along a direction towards the internal channel 21. When the body of the mouse slips or is removed from the internal channel 21, the mouse catching device 100 is ready for the next capturing and killing action, which helps to simplify the deratization process. Before the hitting member 30 is catapulted into internal channel 21 for one more time, due to the reset push block 51 is separated from the hitting member 30, the hitting member 30 will not be blocked by the reset push block 51 or the reset driving member 50 during being catapulted into the internal channel 21, which results in that the hitting member 30 has a large catapulting speed and produces an violent impact on the mouse in the internal channel 21, thus improving success rate of catching mice.

Figure 7:
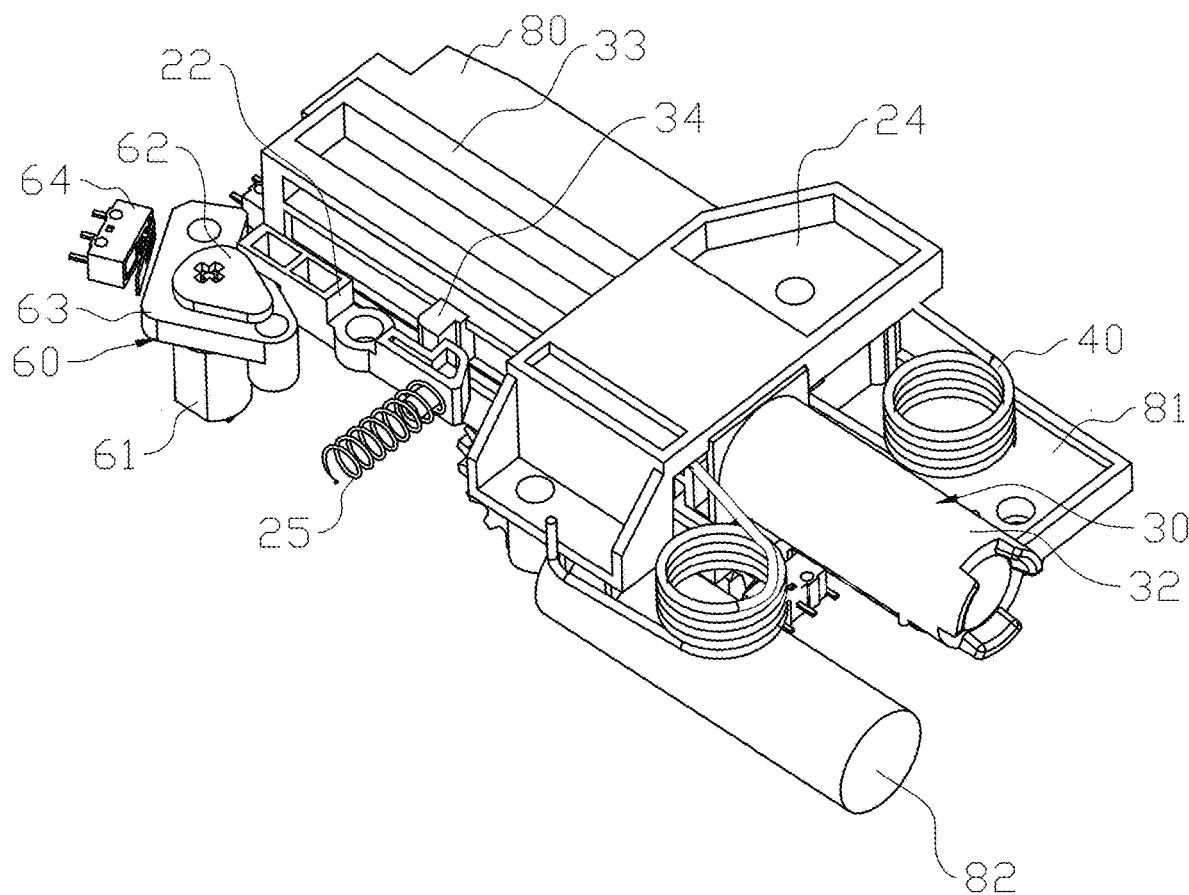
FIG. 7 is a schematic, partial view of the mouse catching device of FIG. 6 with removing the second shell.
Figure 8A:
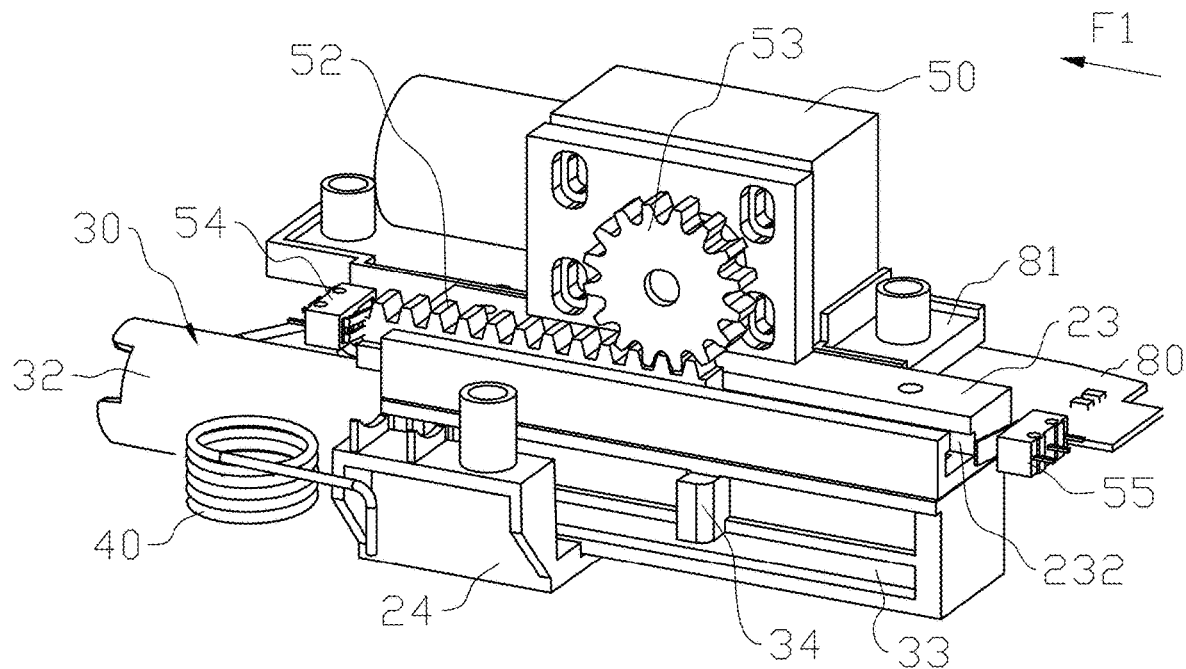
FIG. 8a is a schematic, partial view of the mouse catching device of FIG. 7 with removing the power supply unit and the unlocking module.
Figure 8B:
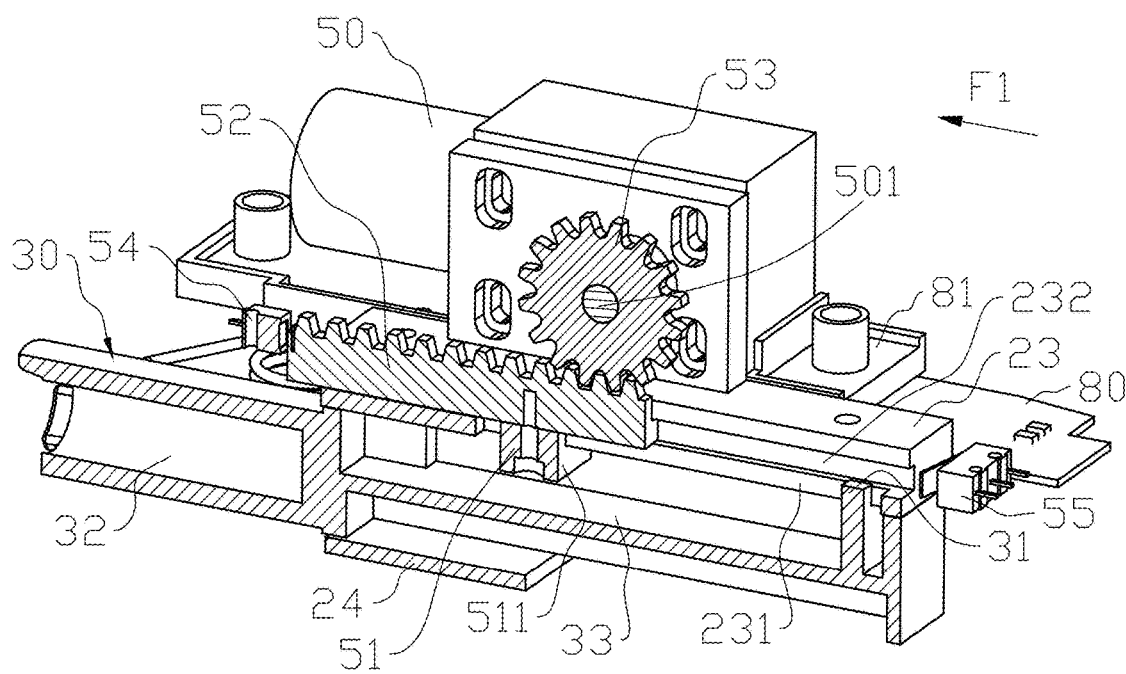

In some embodiments, combined with shown in FIGS. 7-8b, the housing 20 is connected with a support 23 and a limit bracket 24. The support 23 is arranged opposite to the limit bracket 24, and the hitting member 30 is slidably arranged between the support 23 and the limit bracket 24. Specifically, the bracket 23 and the limit bracket 24 are connected to the housing 20 respectively, and are in a stable position relative to the housing 20, so as to define a sliding direction of the hitting member 30.

Further, a guiding groove 231 is defined in at least one of the support 23 and the limit bracket 24, and an extension direction of the guiding groove 231 corresponds to the predetermined direction F1. The hitting member 30 is connected to a slider 31, and the slider 31 is slidably received in the guiding groove 231. Specifically, the slider 31 slides along with the hitting member 30. Since the slider 31 is slidably received in the guiding groove 231, and the extension direction of the guiding groove 231 corresponds to the predetermined direction F1, therefore the sliding direction of the hitting member 30 is also defined by the guiding groove 231, which facilitates to improve a sliding stability of the hitting member 30. Specifically, the extension direction of guiding groove 231 is parallel or general parallel to the predetermined direction F1.

Figure 9:
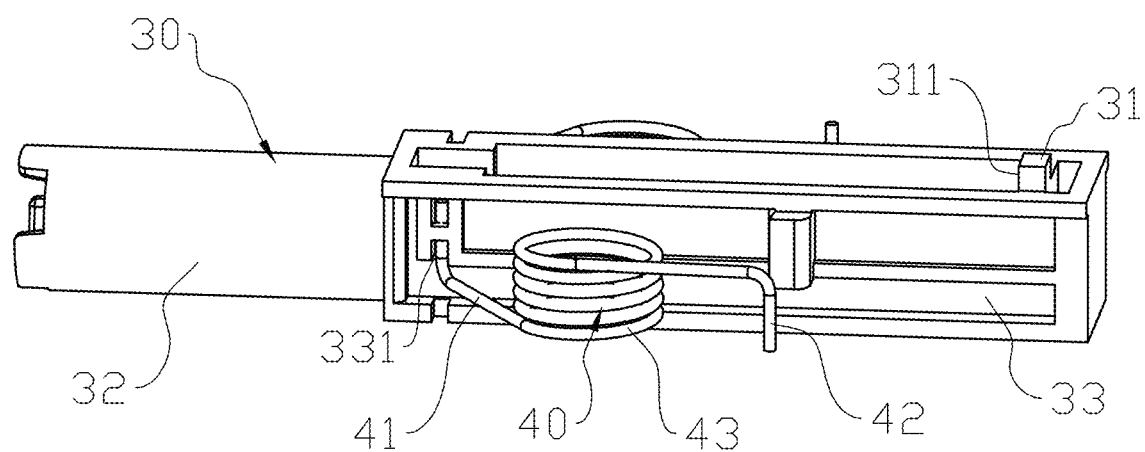

In some embodiments, combined with shown in FIG. 8b and FIG. 9, the hitting member 30 includes a hitting head 32 and a support body 33. The support body 33 is connected to an end of the hitting head 32 away from the internal channel 21. The support body 33 is movably disposed between support 23 and limit bracket 24. The slider 31 is connected to the support 33. Specifically, the hitting head 32 is general cylindrical, and the hitting head 32 is configured to impact mice in the internal channel 21. The support body 33 is general prismatic so as to facilitate defining the sliding direction of the hitting member 30 by the support 23 and the limit bracket 24. Since the slider 31 is connected to the support body 33, the reset push block 51 may resist the slider 31 during the reset push block 51 pushing the hitting member 30 to the second position.

Further, combined with shown in FIG. 8b, the slider 31 is inserted into the guiding groove 231 along a relative direction between support 23 and limit bracket 24. The relative direction is perpendicular to the predetermined direction F1. The support body 33 has a size along the relative direction corresponding to the internal relative distance between the support 23 and the limit bracket 24, thereby preventing the slider 31 from falling off the guiding groove 231.

Figure 10:
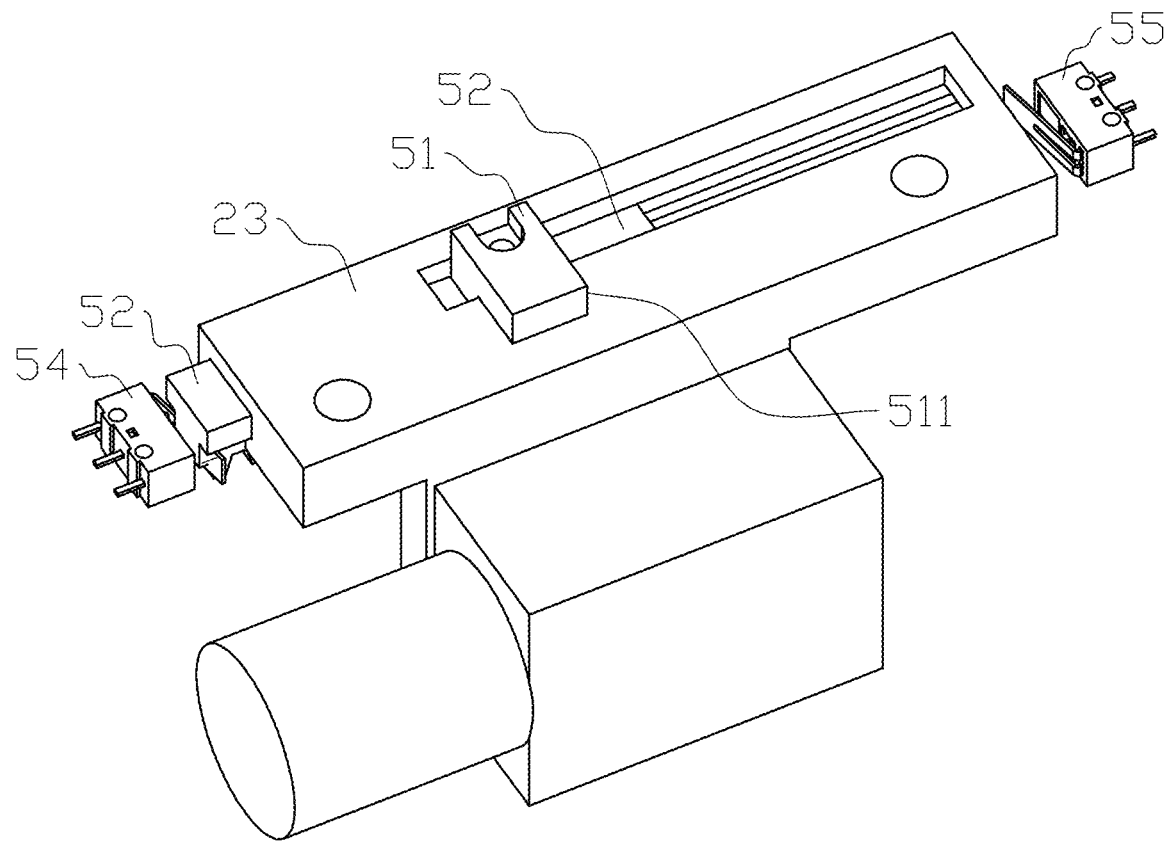

More specifically, combined with shown in FIG. 9 and FIG. 10, the slider 31 has a first resisting surface 311, and the reset push block 51 has a second resisting surface 511. During the reset push block 51 pushing the hitting member 30 to the second position, the first resisting surface 311 resists against the second resisting surface 511, so as to transfer the pushing force of the reset push block 51 on the hitting member 30. When the reset push block 51 leaves the hitting member 30 along the direction towards the internal channel 21, the first resisting surface 311 is separated from the second resisting surface 511, and the distance between the first resisting surface 311 and the second resisting surface 511 may be corresponding to a distance between the first position and the second position, so as to avoid the hitting member 30 being blocked during catapulted into the internal channel 21.

Further, combined with as shown in FIG. 8b, the reset push block 51, driven by the reset driving member 50, moves away from the hitting member 30 along the direction towards the internal channel 21, which means that a separating, spacing relationship is formed between the first resisting surface 311 and the second resisting surface 511.

In some embodiments, combined with shown in FIG. 8a and FIG. 8b, the mouse catching device 100 further includes a rack 52 and a gear 53 that are meshes with each other. The rack 52 is slidably disposed relative to the housing 20. The reset driving member 50 is connected to the housing 20, and the reset driving member 50 has an output shaft 501 connected to the gear 53. The rack 52 is connected to reset push block 51. Specifically, the rack 52 slides along a direction parallel or general parallel to the predetermined direction F1. A rotating axis of gear 53 is in a stable position relative to the housing 20. When the gear 53 rotates driven by the output shaft 501 of the reset driving member 50, the rack 52 slides relative to the housing 20 because of the meshing engagement. The reset push block 51 moves along with sliding of the rack 52. Since a rotation direction of the gear 53 is controlled by the reset driving member 50, the reset push block 51 may be pushed to slide along the direction away from the internal channel 21 and push the hitting member 30 to the second position, and the reset push block 51 may also be pushed to slide along the direction towards the internal channel 21 and is separated from the hitting member 30 in the second position.

More specifically, combined with shown in FIG. 8b, the rack 52 and reset push block 51 are disposed on opposite sides of the support 23, and the reset push block 51 is connected to the rack 52 following passing through the guiding groove 231, thus enabling the rack 52 and reset push block 51 to slide relative to housing 20. More specifically, the rack 52 is connected to the reset push block 51 by fasteners.

In some embodiments, combined with shown in FIG. 8a and FIG. 8b, a guiding slot 232 is defined in the support 23. The rack 52 is slidably received in the guiding slot 232. The reset driving member 50 is connected to the support 23. Specifically, the rack 52 has a plurality of convex teeth which are configured to engage with the gear 53. The gear 53 is disposed on one side of the support 23, a relative direction between the gear 53 and the support 23 is perpendicular or general perpendicular to the predetermined direction F1. One side of the guiding slot 232 facing the gear 53 is open, the convex teeth are exposed via the open position, and a main portion of the rack 52 is accommodated in the guiding slot 232.

More specifically, combined with shown in FIG. 8a, the support 23 is connected to the housing 20. The reset driving member 50 is assembled to the support 23. Further, the gear 53 is anti-rotationally connected to the output shaft 501 of the reset driving member 50. The axis of the output shaft 501 of the reset driving member 50 and the gear 53 are in a stable position relative to each other, which ensures the gear 53 and the rack 52 meshing with each other.

More specifically, the reset driving member 50 is a motor, a rotating cylinder, or other driving device capable of driving the gear 53 to rotate.

In some embodiments, combined with shown in FIG. 8a and FIG. 8b, the mouse catching device 100 further includes a first trip limit 54 and a second trip limit 55. An end of the rack 52 away from the internal channel 21 forms a trigger engagement with the second trip limit 55. An end of the rack 52 adjacent to the internal channel 21 forms a trigger engagement with the first trip limit 54. The first trip limit 54 and the second trip limit 55 form signal feedback engagement with the reset driving member 50 respectively. Specifically, during the reset push block 51 sliding away from the internal channel 21, when the hitting member 30 is pushed to the second position, the second trip limit 55 is triggered by one end of the rack 52 thus triggering the reset driving member 50. When the reset driving member 50 is triggered by the second trip limit 55, the reset driving member 50 stops rotating in an original direction. Following, the reset driving member 50 rotates in an opposite direction opposite to the original direction automatically, resulting in that the reset push block 51 slides towards the internal channel 21. With a sufficient distance is defined between the reset push block 51 and the slider 31, the first trip limit 54 is triggered by the other end of the rack 52 and triggers the reset driving member 50. When the reset driving member 50 is triggered by the first trip limit 54, the reset driving member 50 stops rotating.

More specifically, the trigger between the end of the rack 52 away from the internal channel 21 and the second trip limit 55 may be in the manner of mechanical contact, photoelectric induction or Hall induction. The second trip limit 55 may be a trip switch, a photoelectric sensor or a Hall sensor. More specifically, the trigger between the end of the rack 52 adjacent to the internal channel 21 and the first trip limit 54 may be in the manner of mechanical contact, photoelectric induction or Hall induction. The first trip limit 54 may be a trip switch, a photoelectric sensor or a Hall sensor.

Further, combined with shown in FIG. 8b, two ends of the guiding slot 232 which in the predetermined direction F1 are open, so that the two ends of the rack 52 are capable of sliding to expose from the support 23. Therefore, it facilitates the rack 52 triggers the first trip limit 54 or the second trip limit 55.

In other embodiments, the first trip limit 54 and the second trip limit 55 may directly detect the position of the reset push block 51.

In other embodiments, the rack 52 may be replaced by a sliding component capable of moving back and forth pulled by a hauling rope or a hauling band.

Figure 5:
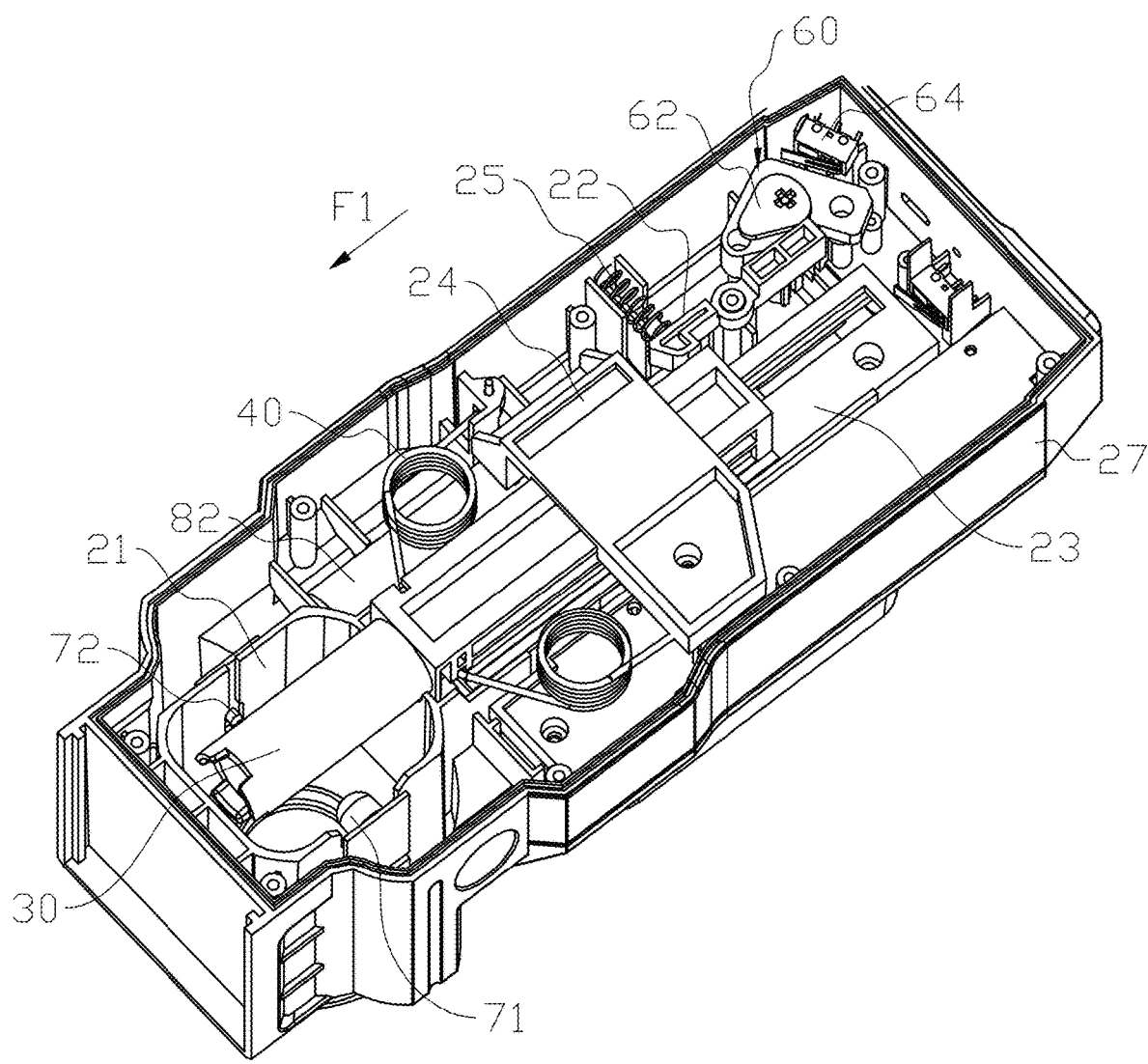
FIG. 5 is a schematic, partial view of the mouse catching device of FIG. 1 with removing the first shell and the hitting member being in the first position.
Figure 6:
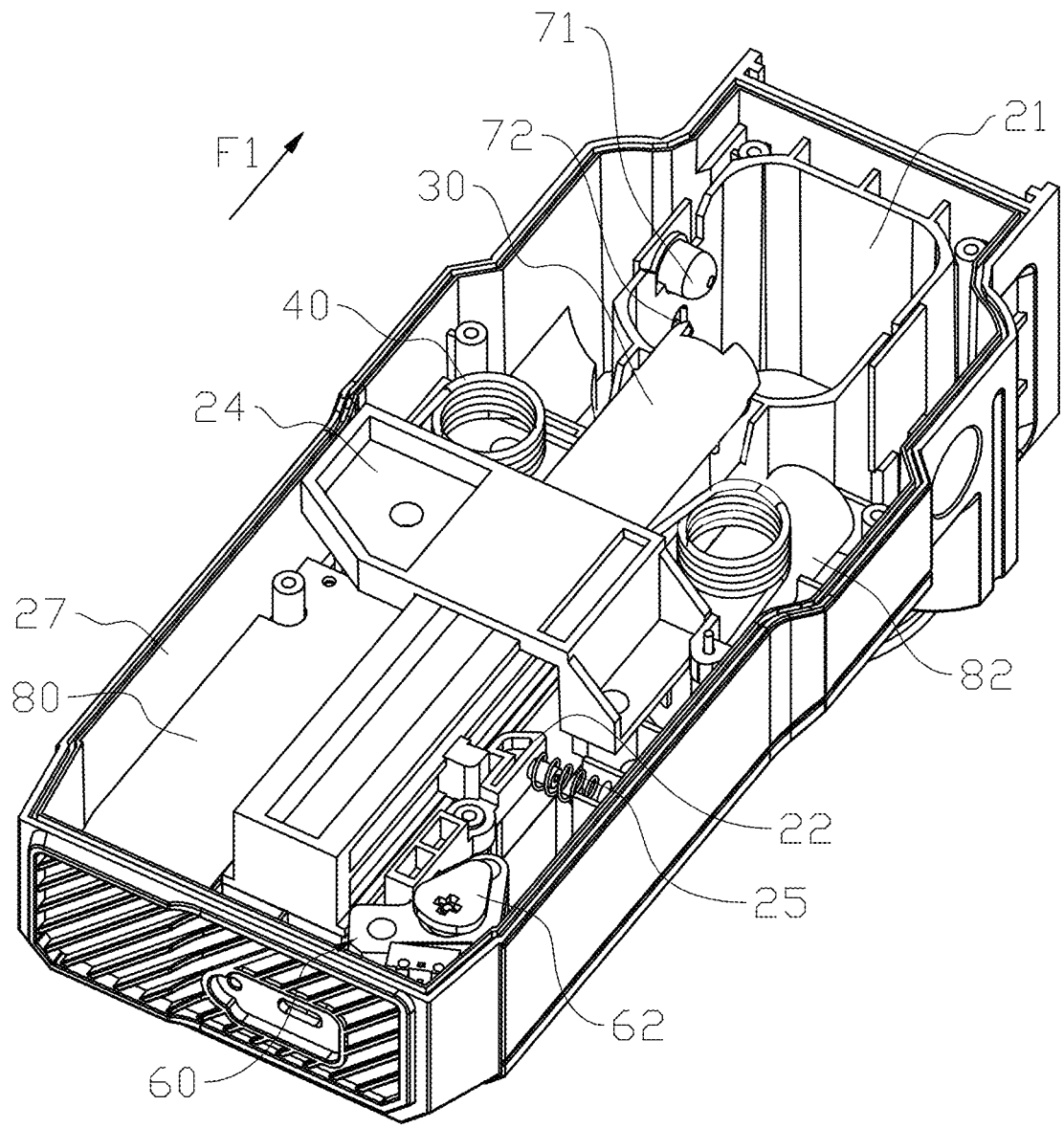
FIG. 6 is a schematic view of the mouse catching device of FIG. 5 with the hitting member being in the second position.

In some embodiments, combined with shown in FIGS. 5-7, the mouse catching device 100 further includes an unlocking module 60 and an inductive trigger member 70. One end of the latching lock 22 latches and engages with the hitting member 30. The unlocking module 60 is configured to push the other end of the latching lock 22 to move the latching lock 22. When the latching lock 22 moves, the latching lock 22 unlocks the hitting member 30 in the second position, so that the hitting member 30 is enabled to slide to the first position and catapulted into the internal channel 21. More specifically, the latching lock 22 is rotatably connected to the housing 20. When the unlocking module 60 pushes the other end of the latching lock 22, the end of the latching lock 22 rotates away from the hitting member 30, thus unlocking the latching lock 30.

Specifically, combined with shown in FIG. 7, the hitting member 30 includes a protrusion 34 connected to one side of the support body 33, and an end of the latching lock 22 is general hook-shaped. A second elastic member 25 is resisted against between one end of the latching lock 22 and the housing 20. When the hitting member 30 moves in the direction from the first position to the second position, the protrusion 34 resists one end of the latching lock 22. Under the guidance of an inclined contacting surface, one end of the latching lock 22 compresses the second elastic member 25. Once the protrusion 34 passes through one end of the latching lock 22, the protrusion 34 is locked by the latching lock 22, and the hitting member 30 is prevented from sliding to the first position. When the other end of the latching lock 22 is pushed by the unlocking assembly 60, one end of the latching lock 22 compresses the second elastic member 25 and moves away from a position in which the latching lock 22 is capable of blocking the protrusion 34, and the hitting member 30 is then catapulted into the internal channel 21 driven by the elastic force of the first elastic member 40.

Specifically, the inductive trigger member 70 is configured to trigger the unlocking module 60 to move and push the other end of the latching lock 22 when the mouse enters the internal channel 21.

In some embodiments, combined with shown in FIG. 7, the unlocking module 60 includes an unlocking driving member 61 and a trigger block 62. The unlocking driving member 61 is connected to the housing 20, and the unlocking driving member 61 has an output shaft. The trigger block 62 is connected to the output shaft of the unlocking driving member 61, and the trigger block 62 is configured to push the other end of the latching lock 22. Specifically, as triggered by the inductive trigger member 70, the output shaft of the unlocking driving member 61 rotates and drives the trigger block 62 to swing. When the trigger block 62 swings, the trigger block 62 pushes the other end of the latching lock 22, so that the engagement between one end of the latching lock 22 and the hitting member 30 is unlocked. Specifically, the trigger block 62 is general cam-shaped.

More specifically, the unlocking driving member 61 is a motor, a rotating cylinder, or other driving device capable of driving the gear 53 to rotate.

Further, combined with shown in FIG. 7, the unlocking module 60 further includes a positioning plate 63 connected to the housing 20. The positioning plate 63 is engaged with the housing 20 to cooperatively locating the main body of the unlocking driving member 61.

Further, combined with shown in FIG. 7, the unlocking module 60 further includes a third trip limit 64, and the third trip limit 64 and the unlocking driving member 61 forms a signal feedback engagement. The unlocking driving member 61 drives the trigger block 62 to reversely rotate so as to provide a reset space for the other end of the latching lock 22, following that the trigger block 62 rotates around an axis adjacent to the other end of the latching lock 22 with a certain angle thus the latching lock 22 unlocking the hitting member 30. The third trip limit 64 is triggered by the trigger block 62 and generates a feedback signal to the unlocking driving member 61, following that the trigger block 62 is rotated with a certain angle in the opposite direction. For the feedback signal of the third trip limit 64, the unlocking driving member 61 stops rotating. Specifically, the third trip limit 64 may be a trip switch, a photoelectric sensor, or a Hall sensor.

In some embodiments, combined with shown in FIG. 5 and FIG. 6, the inductive trigger member 70 has an inductive end, and the inductive end of the inductive trigger member 70 is oriented towards the internal channel 21, so that when the mouse enters into the internal channel 21, the inductive trigger member 70 is capable of recognizing the mouse in time and triggers the unlocking module 60.

In some embodiments, the inductive trigger member 70 includes a PIR inductive element 71. Specifically, the PIR inductive element 71 is configured to detect infrared radiation emitted by mice and senses motion by detecting infrared radiation naturally emitted by mice. When detecting the infrared radiation emitted by the mouse, the PIR inductive element 71 triggers the unlocking module 60. More specifically, the PIR inductive element 71 captures changes of infrared radiation in the environment based on pyroelectric effects. More specifically, the PIR inductive element 71 includes a passive infrared sensor.

In some embodiments, the inductive trigger member 70 includes an infrared inductive element 72. Specifically, a transmitting end and a receiving end are formed on the infrared inductive element 72, and the transmitting end transmits infrared detection light to the receiving end. The transmitting end and the receiving end are opposite to each other and disposed in the internal channel 21, or a space of the internal channel 21 is arranged between the transmitting end and the receiving end. When the mouse passes between the transmitting end and the receiving end, the infrared detection light is blocked by the mouse. When the receiving end does not receive the infrared detection light, the infrared inductive element 72 triggers the unlocking module 60.

In some embodiments, the sensing trigger member 70 includes a PIR inductive element 71 and an infrared inductive element 72 complement each other, result in that the mouse entering into the internal channel 21 may be more reliably identified.

In some embodiments, combined with shown in FIGS. 5-7, the first elastic member 40 includes a torsional elastic element. The torsional elastic element includes a first torsional arm 41, a second torsional arm 42 and a torsional body 43. The torsional body 43 is connected between the first torsional arm 41 and the second torsional arm 42. Specifically, the first torsional arm 41 is hooked to the support body 33, and the second torsion arm 42 is hooked to the housing 20. When the hitting member 30 is in the second position, the torsional body 43 is in a compressed state, so that a relative swing trend between the first torsional arm 41 and the second torsional arm 42 is provided. Therefore, an elastic force is provided on the support body 33. More specifically, the torsional elastic element is a torsional spring.

In some embodiments, combined with shown in FIGS. 5-7, at least one first elastic member 40 includes two torsional elastic elements. Two torsional elastic elements are arranged on opposite sides of the support body 33. Both ends of either of the two torsional elastic elements are connected to the support body 33 and the housing 20 respectively. Specifically, the support body 33 is disposed between two torsional elastic elements and the relative directions between the two torsional elastic elements are parallel or general parallel to the predetermined direction F1. For two torsional elastic elements exert elastic force on the support body 33 simultaneously, a more large elastic force is performed on the support body 33 to increase a speed of the hitting head 32 during hitting the mouse, thus a more violent impact is acted on the mouse in the internal channel 21. Specifically, the two ends of the torsional elastic element are the first torsional arm 41 and the second torsional arm 42 respectively.

Specifically, combined with shown in FIG. 9, a latching hole 331 is defined in the support body 33, and the first torsional arm 41 of the torsional elastic element is inserted into latching hole 331. In addition, two latching holes 331 are defined in two opposite sides of the support body 33 respectively. An end of the first torsional arm 41 is bent and inserted in the latching hole 331. More specifically, an end of the second torsional arm 42 of one of the torsional elastic elements is bent and inserted in the housing 20.

In other embodiments, the first elastic member 40 may also be a compression spring. Specifically, one end of the first elastic member 40 may resist one end of the support body 33 away from the internal channel 21, and the other end of the first elastic member 40 may resist the housing 20.

In some embodiments, combined with shown in FIG. 6 and FIG. 8a, the mouse catching device 100 further includes a circuit module 80. The circuit module 80 is electrically connected between the inductive trigger member 70 and the unlocking module 60. The circuit module 80 controls the motion of the unlocking module 60 according to the feedback signal of the inductive trigger member 70. Specifically, the circuit module 80 is electrically connected between the inductive trigger member 70 and the unlocking driving member 61. Further, the circuit module 80 is electrically connected to the reset driving member 50, the first trip limit 54, the second trip limit 55, and the third trip limit 64. More specifically, the circuit module 80 employs a PCB board structure in whole or in part.

Specifically, combined with shown in FIG. 6 and FIG. 8a, the mouse catching device 100 further includes an electrical fixing plate 81 connected to housing 20. The circuit module 80 is assembled on the electrical fixing plate 81. Further, the end of the second torsional arm 42 of one of the torsional elastic elements is bent and inserted to the electrical fixing plate 81. The limit bracket 24 resists against the second torsional arm 42, thereby preventing the end of the second torsional arm 42 from falling off the electrical fixing plate 81.

In some embodiments, combined with shown in FIG. 6 and FIG. 7, the mouse catching device 100 further includes a power supply unit 82, and the power supply unit 82 is configured to provide power for one or more of the circuit module 80, the reset driving member 50, and the unlocking driving member 61. Specifically, the power supply unit 82 may be a DC power supply such as a lithium battery, a super capacitor or a storage battery, and may be an AC power supply.

In some embodiments, the power supply unit 82 may be recharged. Further, when the power supply unit 82 is fully charged, its output power can allow the reset driving member 50 to perform more than 100 reset operations on the hitting member 30. Further, the reset operation of the hitting member 30 means that the hitting member 30 is pushed from the first position to the second position until the hitting member 30 is locked by the latching lock 22 with overcoming the elastic force of the first elastic member 40.

In some embodiments, the circuit module 80 is electrically connected to a switch controller. When the switch controller is started, the circuit module 80 triggers the reset driving member 50 to run, and the reset push block 51 pushes the hitting member 30 to the second position driven by the reset driving member 50, so that the hitting member 30 is locked at the second position by the latching lock 22, thereby the mouse catching device 100 is in a standby state. More specifically, the switch controller is a rocker switch.

In some embodiments, the circuit module 80 is electrically connected with a PIR inductive element 71 and an infrared inductive element 72. In the standby state, the infrared inductive element 72 starts to accurately detect whether the mouse reaches the position where it can be hit by the hitting member 30. When the infrared detection light is blocked by the mouse, the infrared inductive element 72 generates a feedback signal transferred to the circuit module 80. Following that, the circuit module 80 triggers the unlocking module 60 to move. After being unlocked by the latching lock 22, the hitting member 30 catapults into the internal channel 21 under the elastic force of the first elastic member 40, thus impacting the mouse. More specifically, after every time the hitting member 30 being unlocked by the latching lock 22 with an interval, the reset driving member 50 re-pushes the hitting member 30 to the second position by the reset push block 51, so that the hitting member 30 is locked by the latching lock 22 again. More specifically, a duration of the interval is 1 s, 3 s, 5 s, 8 s, 10 s, 13 s, 15 s, 20 s, or any other time duration that would increase mortality of mice.

Specifically, when none of the infrared radiation of the mouse is detected by the PIR inductive element 71 for a predetermined period of time from starting of the standby state, the mouse catching device 100 begins to be in a dormant state after the predetermined period of time. In the dormant state, electric energy is stopped to supplied to the infrared inductive element 72, thus reducing the power consumption of the power supply unit 82. Therefore, the mouse catching device 100 may work for two months. In the dormant state, the PIR inductive element 71 remains activated, and when the PIR inductive element 71 recognizes the infrared radiation of the mouse, the mouse catching device 100 transforms to the standby state. More specifically, the duration of the predetermined period of time ranges from 1 minute to 1 hour.

In some embodiments, combined with shown in FIGS. 2-4, the housing 20 includes a first shell 26 and a second shell 27. The first shell 26 and the second shell 27 cooperatively define a space for accommodating at least the hitting member 30, the first elastic member 40, the reset push block 51 and the reset driving member 50. Specifically, the first shell 26 and the second shell 27 further cooperatively define the internal channel 21, and an opening 211 of the internal channel 21 is defined in the first shell 26. The second shell 27 may be configured to mounting a bait.

More specifically, the support 23, the limit bracket 24 and the electrical fixing plate 81 are fixed to the second shell 27 by fasteners respectively. More specifically, the fasteners are screws.

Further, combined with shown in FIG. 2, the housing 20 further includes a mounting plate 28. The first shell 26 and the second shell 27 are connected to the mounting plate 28 respectively. The mounting plate 28 is configured to be fixedly connected to walls or other support structures so that the mouse catching device 100 is integrally fixed in a certain position. More specifically, when the mounting plate 28 is fixed, the opening 211 of the internal channel 21 faces downwards.

The above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A mouse catching device, comprising:
a housing defining an internal channel, and a latching lock being movably connected to the housing;
a hitting member slidably connected to the housing along a predetermined direction, the hitting member having a first position and a second position relative to the housing; the hitting member extending into the internal channel with a greater extent at the first position than at the second position, and the latching lock being configured to lock the hitting member in the second position;
at least one first elastic member connected to the hitting member, the at least one first elastic member is configured to exert an elastic force on the hitting member, which enabling the hitting member to slide from the second position to the first position; and
a reset push block slidably connected to the housing, the reset push block being connected to a reset driving member, the reset push block being configured to push the hitting member to the second position driven by the reset driving member, and the reset push block being also configured to move away from the hitting member along a direction towards the internal channel driven by the reset driving member;
wherein the housing is connected with a support and a limit bracket, the support is arranged opposite to the limit bracket, the hitting member is slidably arranged between the support and the limit bracket; a guiding groove is defined in at least one of the support and the limit bracket, an extension direction of the guiding groove corresponds to the predetermined direction; the hitting member is connected to a slider, and the slider is slidably received in the guiding groove.

2. The mouse catching device of claim 1, wherein the hitting member comprises a hitting head and a support body, the support body is connected to an end of the hitting head away from the internal channel; the support body is movably disposed between the support and the limit bracket, and the slider is connected to the support.

3. The mouse catching device of claim 2, wherein the at least one first elastic member comprises two torsional elastic elements, the two torsional elastic elements are arranged on opposite sides of the support body, and both ends of either of the two torsional elastic elements are connected to the support body and the housing respectively.

4. The mouse catching device of claim 1, wherein further comprises a rack and a gear engaged with the rack, the rack is slidably disposed relative to the housing, the reset driving member is connected to the housing, the reset driving member has an output shaft connected to the gear, and the rack is connected to reset push block.

5. The mouse catching device of claim 4, wherein further comprises a first trip limit and a second trip limit, an end of the rack away from the internal channel forms a trigger engagement with the second trip limit, an end of the rack adjacent to the internal channel forms a trigger engagement with the first trip limit, and the first trip limit and the second trip limit form signal feedback engagement with the reset driving member respectively.

6. The mouse catching device of claim 4, wherein further comprises a support, a guiding slot is defined in the support, the rack is slidably received in the guiding slot, and the reset driving member is connected to the support.

7. The mouse catching device of claim 1, wherein further comprises an unlocking module and an inductive trigger member, one end of the latching lock latches and engages with the hitting member, the unlocking module is configured to push the other end of the latching lock, and the inductive trigger member is configured to trigger the unlocking module to move when the mouse enters the internal channel.

8. The mouse catching device of claim 7, wherein the unlocking module comprises an unlocking driving member and a trigger block, the unlocking driving member is connected to the housing, and the unlocking driving member has an output shaft; the trigger block is connected to the output shaft of the unlocking driving member, and the trigger block is configured to push the other end of the latching lock.

9. The mouse catching device of claim 8, wherein the unlocking module further comprises a third trip limit, and the third trip limit and the unlocking driving member forms a signal feedback engagement.

10. The mouse catching device of claim 7, wherein further comprises a circuit module, the circuit module is electrically connected between the inductive trigger member and the unlocking module, and the circuit module controls the motion of the unlocking module according to a feedback signal of the inductive trigger member.

11. The mouse catching device of claim 7, wherein the inductive trigger member has an inductive end, and the inductive end of the inductive trigger member is oriented towards the internal channel; the inductive trigger member comprises a PIR inductive element, and/or the inductive trigger member comprises an infrared inductive element.

12. The mouse catching device of claim 7, wherein the inductive trigger member comprises a PIR inductive element and an infrared inductive element, the mouse catching device comprises a standby state and a dormant state; in the standby state, electric energy is supplied to the infrared inductive element and the PIR inductive element, thus the infrared inductive element and the PIR inductive element are ready for detect the mouse; in the dormant state, electric energy is stopped to supplied to the infrared inductive element, electric energy is supplied to the PIR inductive element, and the PIR inductive element is ready for detect the mouse.

13. The mouse catching device of claim 2, wherein the first elastic member comprises a torsional elastic element, the torsional elastic element comprises a first torsional arm, a second torsional arm and a torsional body, the torsional body is connected between the first torsional arm and the second torsional arm, the first torsional arm is hooked to the support body, and the second torsion arm is hooked to the housing.

14. The mouse catching device of claim 1, wherein the housing comprises a first shell and a second shell, the first shell and the second shell cooperatively define a space for accommodating at least the hitting member, the first elastic member, the reset push block and the reset driving member; and the first shell and the second shell cooperatively define the internal channel.

15. The mouse catching device of claim 1, wherein the hitting member comprises a protrusion, a second elastic member is disposed between one end of the latching lock and the housing, the second elastic member resists the latching lock and the housing, and the protrusion is configured to be engaged with the latching lock when the latching lock is in the second position.

* * * * *